United States Patent Office 3,542,770
Patented Nov. 24, 1970

3,542,770
RING A-FUSED PYRIDAZONE STEROIDS
Manuel Debono, Indianapolis, Ind., assignor to Eli Lilly and Company, Indianapolis, Ind., a corporation of Indiana
No Drawing. Filed Oct. 24, 1968, Ser. No. 770,390
Int. Cl. C07c 173/10
U.S. Cl. 260—239.5
4 Claims

ABSTRACT OF THE DISCLOSURE

The preparation of steroids containing a ring A-fused pyridazone useful as antimicrobial and antiviral agents is described.

BACKGROUND OF THE INVENTION

Steroids containing a ring A-fused heterocycle are well known. For example, U.S. Pats. 3,376,291; 3,376,292; 3,365,444; 3,364,203; 3,325,480; 3,317,520; 3,300,486; 3,300,483; 3,299,054; 3,296,053; 3,290,293; 3,287,355; 3,257,385; 3,255,182; 3,236,839; and 3,233,707 concern steroids having a ring A-fused pyrazole. In addition, 17β-hydroxy-17α-methyl-androstano-[3,2-c]-pyrazole, known generically as stanozol, is marketed as an anabolic drug. Steroids with a ring A-fused pyrimidine are described in U.S. Pats. 3,371,086; 3,341,522; 3,318,872 and 3,198,790. Steroids containing other ring A-fused heterocycles are described in U.S. Pats. 3,357,972 (thiadiazole); 3,281,424; 3,280,112 (triazole); 3,280,113 (pyrazine and piperazine); and 3,184,489 (pteridine).

Recently a steroid containing a ring A-fused pyridazone was described in Bull. Soc. Chim. (France) 1968, 624.

It is an object of this invention to provide steroids containing a ring A-fused pyridazone and a novel method for preparing such compounds.

SUMMARY OF THE INVENTION

This invention provides steroids containing a ring A-fused steroid pyridazone according to the following formula:

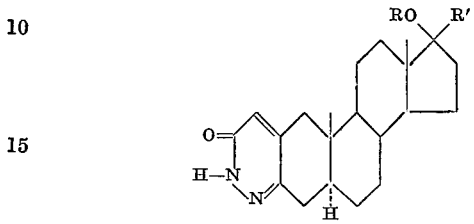

wherein R is hydrogen or acetyl; and R' is hydrogen or $C_1$–$C_3$ alkyl such as methyl, ethyl, propyl, n-propyl, and isopropyl.

Compounds coming within the scope of this invention include 17β-hydroxy-6'(1'H)-oxo-5α-androstano(3,2-c)-pyridazine; 17β-acetoxy-6'(1'H)-oxo-5α-androstano(3,2-c)-pyridazine; 17α-n-propyl-17β-hydroxy-6'(1'H)-oxo-5α-androstano(3,2-c)-pyridazine; 17α-ethyl-17β-acetoxy-6'(1'H)-oxo-5α-androstano(3,2-c)-pyridazine; and 17α-isopropyl-17β-hydroxy-6'(1'H)-oxo-5α-androstano(3,2-c)-pyridazine.

Compounds having the above structure are prepared according to reaction sequence 1 below which exemplifies the process with reference to the preparation of 17β-hydroxy-6'(1'H)-oxo-5α-androstano(3,2-c)-pyridazine.

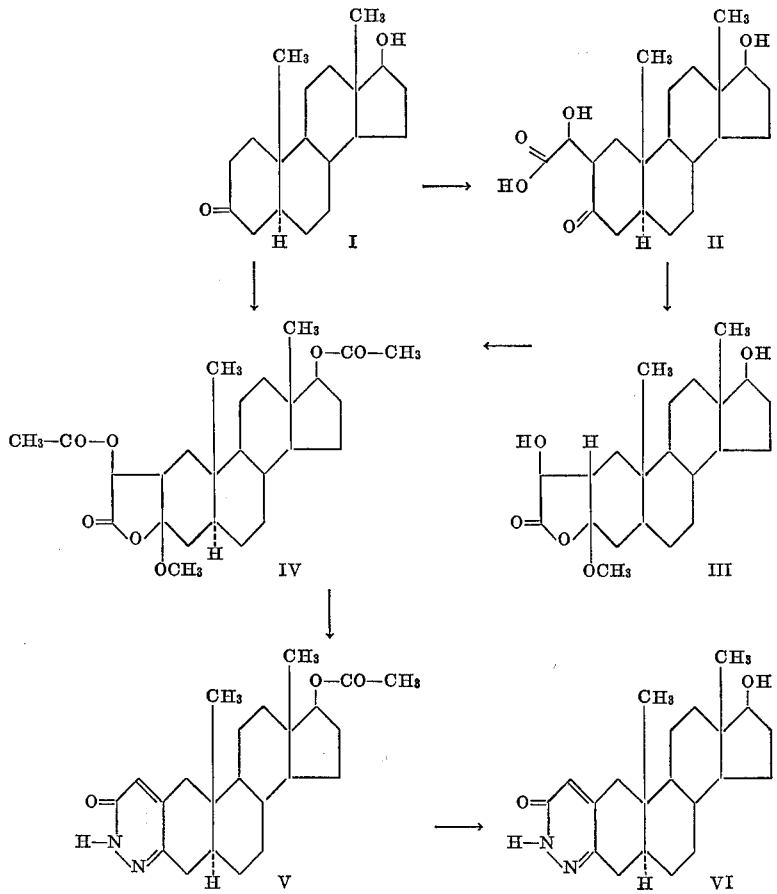

According to the above reaction scheme, condensation of 5α-androstan-17β-ol-3-one (I) with glyoxylic acid in the presence of base yields the corresponding 2-carboxy-2-hydroxymethyl derivative (II), which compound readily lactolizes upon treatment with acid to give the ring A-fused lactone (III). Acetylation of this compound yields the corresponding diacetate (IV) which is converted by refluxing in hydrazine solution to the ring A-fused pyridazone (V) having an acetate group at 17. Mild alkaline hydrolysis converts the acetate to the corresponding free hydroxyl derivative (VI).

Although the reaction sequence useful for preparing the pyridazones of this invention has been illustrated with regard to the 17β-hydroxy derivative, it will be understood that the corresponding compounds containing a 17α-lower alkyl group can be prepared by substituting the corresponding 17α-lower alkyl 5α-androstan-17β-ol-3-one for 5α-androstan-17β-ol-3-one in the above reaction sequence. These latter compounds are prepared by conventional procedures from the androstan-3,17-dione. When the above sequence of reactions is carried out with a 17α-alkyl androstan-17β-ol-3-one as a starting material, the product of the reaction step IV to V is not an acetate since the reaction conditions are not sufficiently stringent to form the 17α-acetoxy derivative.

In carrying out the above reactions, inert polar solvents such as the lower aliphatic alcohols are employed in each step. For example, in condensing the androstanolone (I) with glyoxylic acid to form the hydroxy acid (II), aqueous methanol is preferably employed as a solvent and sodium hydroxide as the basic condensing agent. Ordinarily, heat is not required for the condensation, since the reaction goes substantially to completion overnight at room temperature. The lactolization step (II→III) is also preferably carried out in methanol solution employing a catalytic amount of hydrogen chloride. Acetylation of the hydroxy compound is conveniently achieved using anhydrous sodium acetate in acetic anhydride. Again, conversion of the furanone diacetate (IV) to the pyridazone (V) is conveniently carried out in methanolic solution. Either hydrazine hydrate or anhydrous hydrazine can be used in this step. Hydrolysis of the pyridazone acetate (V) to yield the hydroxy pyridazone (VI) is accomplished by treatment with dilute methanolic sodium hydroxide.

The compounds of this invention have both myotropic and androgenic activity with a favorable myotropic/androgenic ratio. In addition the compounds are capable of suppressing the growth of certain viruses in vitro; for example, 17α-methyl-17β-hydroxy-6′(1′H)-oxo-5α-androstano(3,2-c)-pyridazine suppresses the growth of vaccinia virus, when added to a medium in which vaccinia virus is growing, at rates as low as 250 p.p.m. The compound also has activity against measles virus at the 2000 p.p.m. level. Other viruses whose growth is affected by the application to a virus habitat of effective concentrations of the antiviral agents of this invention include pseudorabies, herpes and Coxsackie. The compounds of this invention can therefore be used in aqueous solution, preferably with a surfactant added, to decontaminate surfaces on which vaccinia, measles or other virus is present.

In dilutions from 250–2000 mcg./ml., the compounds of this invention also have anti-protozoal activity in vitro.

In addition, the compounds of this invention have antibacterial activity in vitro, particularly against *S. aureus, B. subtilis, Xanthomonas phaseoli, Alternaria solani, Botrytis cinerea,* and the like at concentrations of 100 mcg. per ml. When used in combatting these microorganisms, the compounds are applied in the same way as indicated above for use as anti-viral agents.

This invention is further illustrated by the following specific example:

EXAMPLE 1

A slurry of 10 g. of 5α-androstan-17β-ol-3-one in 200 ml. of 50 percent aqueous methanol was mixed with 7 g. of a 40 percent glyoxylic acid solution and 2.72 g. of sodium hydroxide. The reaction mixture was stirred at room temperature for about 18 hours. 600 ml. of water were then added, and the reaction mixture extracted with ether to remove any unreacted starting material. The alkaline layer was carefully acidified with acetic acid to a pH of about 5.5, and the resulting acidic solution extracted 3 times with equal volumes of ether. The ether extracts were combined, separated and dried, and the ether removed therefrom by evaporation in vacuo. Recrystallization of the resulting residue yielded 2-carboxy-2-hydroxymethyl-5α-androstan-17β-ol-3-one. M.P.=190–191° C.; $[\alpha]^{20}=+32.9°$ (C=1 in ethanol); $\gamma_{max}^{mull}=1710$ cm.$^{-1}$.

*Analysis.*—Calc'd (percent): C, 69.10; H, 9.09. Found (percent): C, 68.92; H, 8.84.

2-carboxy-2-hydroxymethyl-5α-androstan-17β-ol-3-one prepared as above was dissolved in methanol to which a 10 percent methanolic hydrogen chloride solution was added at the rate of 1 ml. per 25 ml. of solution. The reaction mixture was placed under a slight vacuum, and the solvent was evaporated slowly with cooling. A white amorphous solid precipitated which was isolated by filtration. This solid, comprising 4′,17β-dihydroxy-3-methoxy-5α-androstano(3,2-c)furan-5′-one, melted at about 255–260° C.; $\gamma_{max}^{mull}=1760$ cm.$^{-1}$; $[\alpha]^{25}=+85.47°$ (C=1.17 in dimethylformamide).

*Analysis.*—Calc'd (percent): C, 66.66; H, 9.08. Found (percent): C, 66.62; H, 9.08.

The structure of the above product was verified by conversion to 3-methoxy-5′-(2′H)-oxo-17β-hydroxy-5α-androstano (3,2-b)furan melting at about 199–200° C.

2-carboxymethylene-5α-androstan-17β-ol-3-one was also prepared by following the method of Kurath and Cole, J. Org. Chem. 26, 1939 (1961) for the condensation of glyoxylic acid with 17-keto steroids except that the reaction mixture was not refluxed but instead was heated gradually to 50° C. over a 20-minute period.

A solution containing 2 g. of 4′,17β-dihydroxy-3-methoxy-5α-androstano-(3,2-c)-furan-5′-one in 75 ml. of acetic anhydride was refluxed under nitrogen for about 1.5 hours. 0.5 g. of anhydrous sodium acetate was added and refluxed continuing for three hours. The reaction mixture was cooled and the solvents removed by evaporation in vacuo. The residue remaining in the flask was extracted with 500 ml. of ether. The ether extract was filtered, and the ether removed by evaporation in vacuo. Recrystallization of the residual oil yielded 4′,17β-diacetoxy-3-methoxy-5α-androstane(3,2-c)-furan-5′-one melting at about 171–174° C. after recrystallization from methanol. $[\alpha]_D^{25}=-12.57°$ (C=0.350 in chloroform).

*Analysis.*—Calc'd (percent): C, 67.59; H, 8.29. Found (percent): C, 67.57; H, 8.28.

A solution of 0.5 g. of 4′,17β-diacetoxy-3-methoxy-5α-androstano-(3,2-c)-furan-5′-one in 50 ml. of ethanol was mixed with 0.5 ml. of 85 percent hydrazine hydrate and the mixture refluxed for about 3 hours. The volatile substituents were removed by evaporation in vacuo. Recrystallization of the resulting residue from ethanol yielded 17β-acetoxy-6′(1′H)-oxo-5α-androstano-(3,2-c)-pyridazine melting at about 295–299° C. $[\alpha]_D^{20}=+38.46$ (C = 0.520 in chloroform); $\lambda_{max}^{chloroform} = 295$ mμ (E°=2062).

*Analysis.*—Calcd. (percent): C, 71.84; H, 8.39; N, 7.29. Found (percent): C, 71.55; H, 8.65; N, 7.27.

17β-hydroxy-6′(1′H)-oxo-5α-androstano-(3,2-c)-pyridiazine was prepared from the above 17β-acetoxy compound by hydrolysis in dilute base.

17α-methyl-17β-hydroxy-6′(1′H)-oxo-5α-androstano-(3,2-c)-pyridazine was also prepared by the above procedure and melted at about 291–292° C. after recrystallization from ethanol. The compound crystallized as a hemi-ethanolate.

*Analysis.*—Calcd. (percent): C, 72.78; H, 9.30; N, 7.38. Found (percent): C, 72.79; H, 9.32; N, 7.68.

I claim:
1. A ring A-fused steroid pyridazone of the formula:

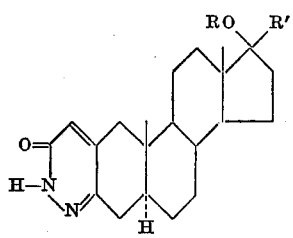

wherein R is hydrogen or acetyl; and R' is hydrogen or $C_1$-$C_3$ alkyl.

2. A compound according to claim 1 wherein R and R' are hydrogen.
3. A compound according to claim 1 wherein R is hydrogen and R' is methyl.
4. A compound according to claim 1 wherein R is acetyl and R' is hydrogen.

No references cited.

HENRY A. FRENCH, Primary Examiner

U.S. Cl. X.R.

260—239.57, 397.4, 999